United States Patent [19]
Bartimes et al.

[11] Patent Number: 5,215,694
[45] Date of Patent: Jun. 1, 1993

[54] METHOD OF FORMING A CONTAINER WITH DRIPLESS SPOUT

[75] Inventors: George F. Bartimes, Chicago; Lawrence D. Stepenske, Darien, both of Ill.

[73] Assignee: Continental Plastic Containers, Inc., Norwalk, Conn.

[21] Appl. No.: 597,347

[22] Filed: Oct. 15, 1990

[51] Int. Cl.$^5$ .................. B29C 49/74; B29C 57/12
[52] U.S. Cl. ............................ 264/68; 222/571; 264/138; 264/163; 264/533
[58] Field of Search ............ 264/68, 138, 161, 533, 264/536, 310, 163; 222/571; 425/527, 531

[56] References Cited

U.S. PATENT DOCUMENTS

| | | | |
|---|---|---|---|
| 3,410,939 | 11/1968 | Driza et al. | 264/163 |
| 3,418,690 | 12/1968 | Edwards | 264/163 |
| 3,769,394 | 10/1973 | Latreille | 264/161 |
| 3,917,788 | 11/1975 | Padovani | 264/163 |
| 4,173,447 | 11/1979 | Bradbury | 264/533 |
| 4,497,622 | 2/1985 | Grebowiec | 425/527 |
| 4,497,623 | 2/1985 | Beuscher | 264/533 |
| 4,545,953 | 10/1985 | Cage et al. | 264/533 |
| 4,753,591 | 6/1988 | Maes et al. | 264/533 |
| 4,865,533 | 9/1989 | Hart et al. | 425/527 |

FOREIGN PATENT DOCUMENTS 178723  11/1982  Japan .................... 264/138

Primary Examiner—Jan H. Silbaugh
Assistant Examiner—Brian J. Eastley
Attorney, Agent, or Firm—Eugene F. Friedman

[57] ABSTRACT

Method of forming a pour spout portion of a blow molded plastic bottle with a dripless lip. In one form, the terminal end of the pour spout is internally reamed at an angle so as to terminate in an exterior sharp edge, after which the resultant tapered end portion of the pour spout is engaged by a rotating tool which frictionally heats the plastic engaged thereby and progressively turns over the sharp edge through an angle on the order of 180° to provide the desired dripless lip. In another form, the pour spout portion of the container neck finish is provided with an integrally molded outwardly directed hollow rib which lies in a sloping plane. The rib extends only partially about the circumference of the pour spout. The pour spout is then trimmed at an angle to the axis of the pour spout and parallel to the plane of the rib so as to provide for a pour lip of limited circumferential extent and which pour lip, depending upon the plane of trimming may terminate in a sharp dripless lip. This latter container is provided with a special closure which includes a hollow plug portion and progressively engages in the trimmed pour spout and forms a seal therewith.

17 Claims, 3 Drawing Sheets

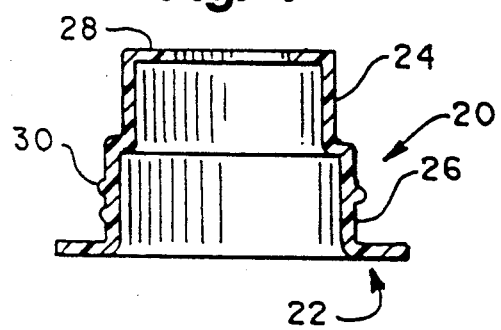
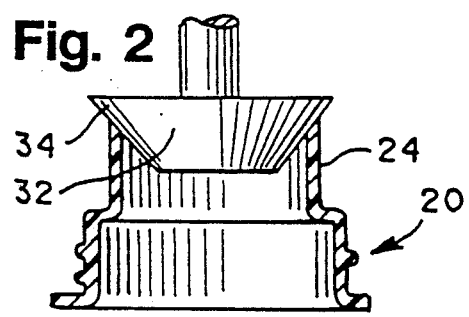
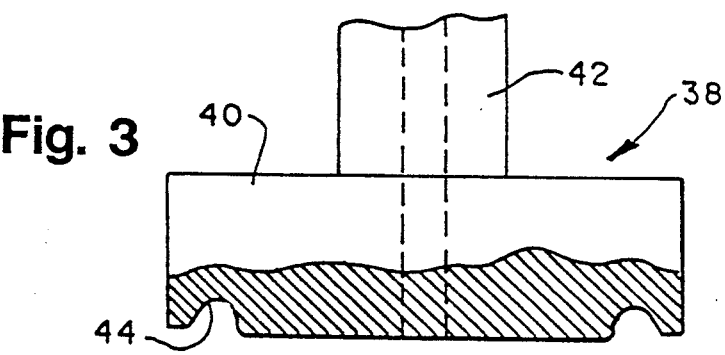
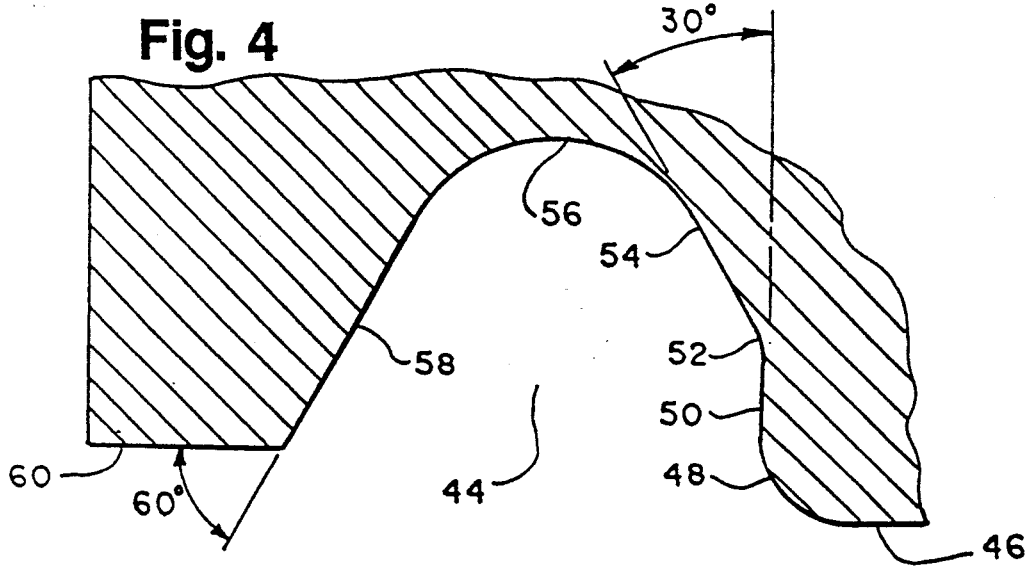

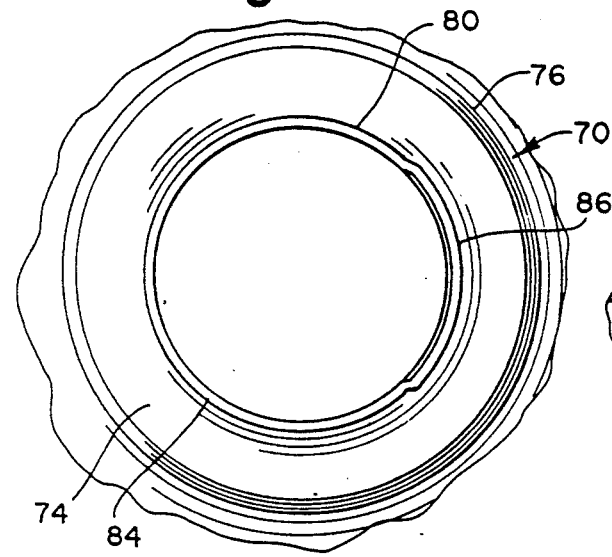
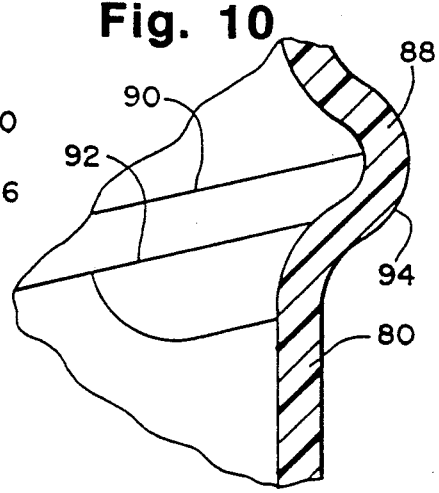
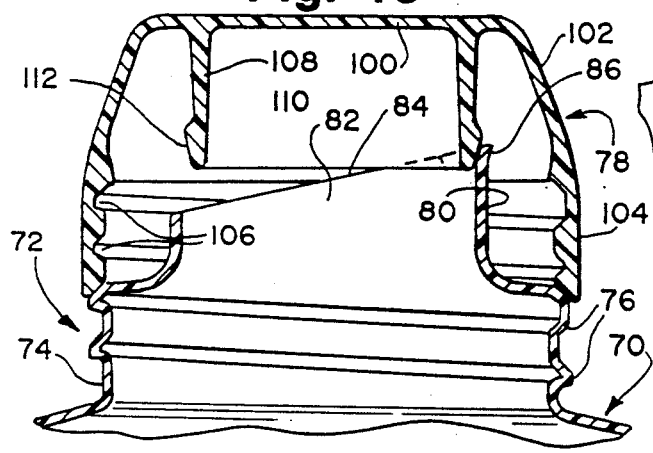
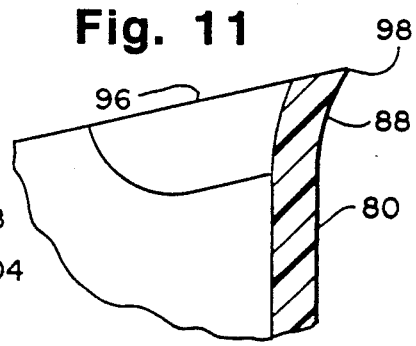
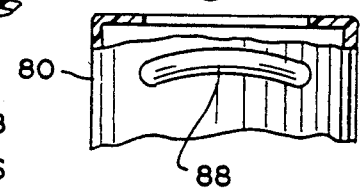
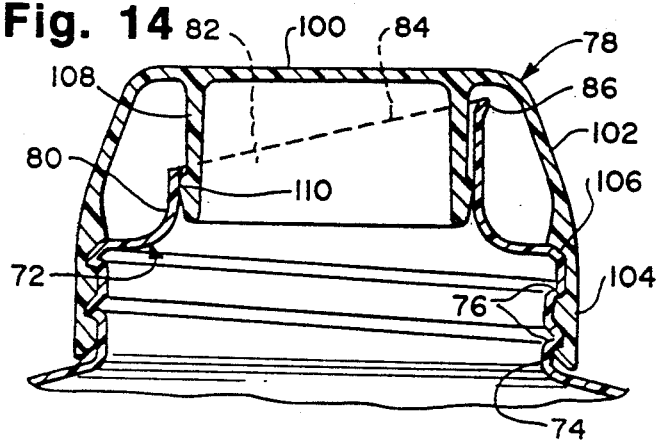
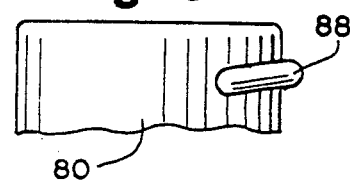

METHOD OF FORMING A CONTAINER WITH DRIPLESS SPOUT

This invention relates in general to new and useful improvements in blow molded plastic containers having a neck finish from which a liquid product packaged within such container is poured, and more particularly to providing such container with a dripless pour spout.

BACKGROUND OF THE INVENTION

Dripless lips for pour spouts are old and well known. Such dripless lips normally terminate in outwardly turned top edges on pour spouts which terminate in a thin edge.

SUMMARY OF THE INVENTION

This invention relates both to certain improvements in the method of forming a common type of dripless lip and in a novel method of forming a modified form of dripless lip which dripless lip is also believed to be novel.

With the above and other objects in view that will hereinafter appear, the nature of the invention will be more clearly understood by reference to the following detailed description, the appended claims, and the several views illustrated in the accompanying drawings.

FIG. 1 is a vertical sectional view taken through a neck finish of a newly blow molded plastic bottle which is formed from an extruded parison.

FIG. 2 is a fragmentary sectional view similar to FIG. 1 and shows the open mouth of the neck finish being reamed so that the end part of the neck finish starts as a thin edge and tapers in thickness downwardly.

FIG. 3 is an enlarged fragmentary elevational view with parts broken away and shown in section of a tool for effecting the turning of the end part of the neck finish shown in FIG. 2 to form a dripless lip in accordance with this invention.

FIG. 4 is an enlarged fragmentary vertical sectional view showing in more detail the contour of the work surface of the tool of FIG. 3.

FIG. 8 is a fragmentary elevational view with parts broken away and shown in section of a modified form of a molded container neck finish provided with a dripless lip forming hollow bead.

FIG. 9 is a side elevational view of the neck finish of FIG. 8 and shows the tilting of the bead relative to the axis of the neck finish.

FIG. 10 is an enlarged fragmentary vertical sectional view showing two locations at which the neck finish may be trimmed.

FIG. 11 is an enlarged fragmentary sectional view showing the neck finish of FIGS. 8, 9 trimmed at a slightly different place on the hollow bead.

FIG. 12 is a top plan view of the container neck finish trimmed as shown in FIG. 11 and shows the specific configuration of the dripless lip.

FIG. 13 is a vertical sectional view taken through the entire neck finish of a container having a partial dripless lip as shown in FIGS. 11 and 12 with there being applied a closure which includes a plug.

FIG. 14 is a fragmentary vertical sectional view similar to FIG. 13 with the closure fully applied and the plug sealing the dispensing mouth of the neck finish.

Figure 5:
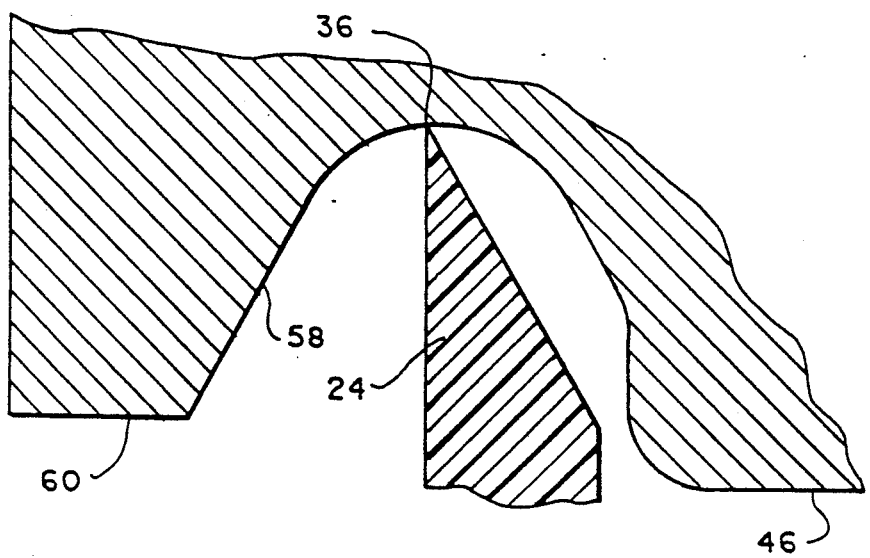
FIG. 5 is a schematic view showing the tool initially engaging the tapered end of the neck finish.
Figure 6:
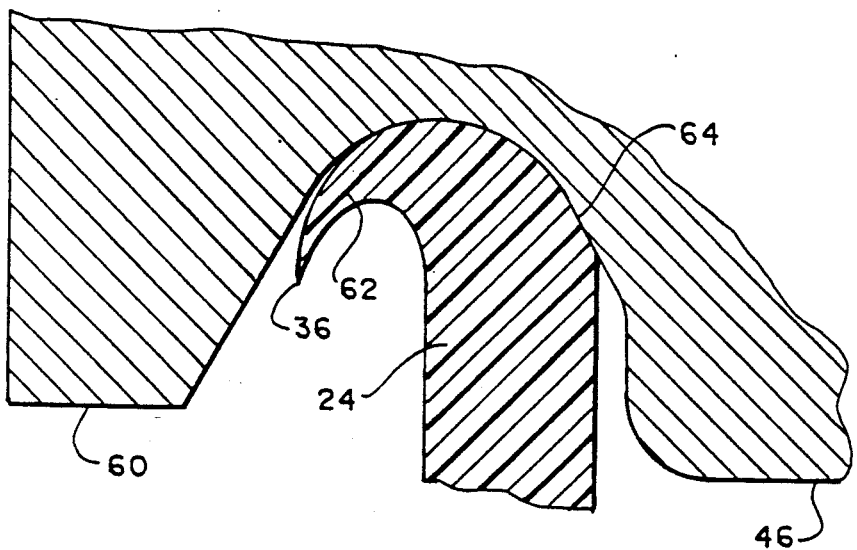
FIG. 6 is a schematic view similar to FIG. 5 and shows the final position of the tool with respect to the neck finish.
Figure 7:
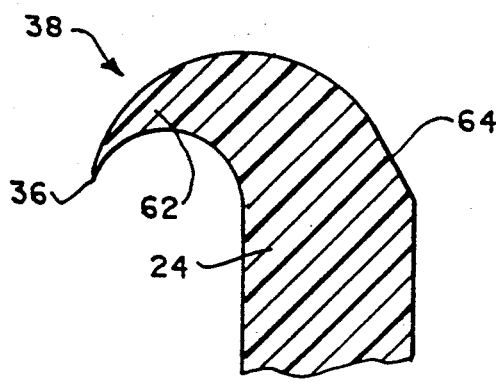
FIG. 7 is a fragmentary vertical sectional view showing the final shape of the dripless lip after a certain degree of spring back.

Reference is first made to the dripless lip of FIG. 7 and the method of forming the same as shown in FIGS. 1-6.

Reference is first made to FIG. 1 where there is illustrated a molded neck finish 20 of the container 22. The neck finish 20 includes an upper portion 24 which is of a slightly smaller diameter than the lower neck finish portion 26. The upper portion 24 is cylindrical and is, as a feature of its formation, provided with an inwardly directed flange 28 at the free end thereof. In the preferred embodiment of the container 25, the neck finish lower portion 26 will be provided with suitable threads 30 for releasably securing a conventional closure (not shown) to the container 22.

Referring now to FIG. 2, it will be seen that the upper portion 24 of the neck finish 20 has been internally reamed utilizing a rotating reamer 32. The reamer 32 is a cutting edge 34 disposed at a desired selected angle to the axis of the neck finish 20. As shown in FIG. 5, the preferred angle is 30° to the central axis of the neck finish 20.

It is to be understood that the upper part 24 of the neck finish 20 will be reamed to terminate in a free pointed edge 36 as is clearly shown in FIG. 5.

After the upper part 24 of the neck finish 20 has been reamed and prepared for the formation of a dripless lip, the upper end of the neck finish is engaged by a tool which is shown in FIG. 3 and generally identified by the numeral 38. The tool 38 includes a head 40 and a shank 42 by which the head 40 is rotated. The undersurface of the head 40 is provided with a work engaging groove 44.

The cross section of the groove 44 is best shown in FIG. 4. Starting at the radially inner surface of the groove 44, it will be seen that the groove 44 starts with the bottom wall 46 in a radius 48 which terminates in an axial line 50 which defines a cylindrical wall. At the upper end of the line 50 there is an inwardly directed radius 52 which terminates in an upwardly and outwardly sloping line 54 which defines a conical surface. The line 54 preferably slopes at the same angle as the angle on paper formed by the reamer 32.

The top of the groove 44 is defined by a radius 56 which terminates at its outer end in a downwardly and outwardly sloping straight line 58 which designates an outer conical surface. The straight line 58 terminates in an outer annular bottom wall 60 which is higher than the central bottom wall 46. Preferably the slope of the conical portion defined by the sloping line 58 is at an angle on the order of 60° while the illustrated reaming angle is on the order of 30°.

The tool 38, while being rotated, is brought down relative to the reamed top part 24 of the neck finish 20 as shown in FIG. 5. The downward movement of the tool 38 is then continued with the tapered or flared extreme end of the upper part 24 being rolled radially outwardly. The outward rolling of the upper part 24 is facilitated by the rotation of the tool 58 which frictionally heats the tapered upper part 24.

The tool 38 is moved downwardly until it reaches the position shown in FIG. 6 at which time the conical surface of the groove 44 defined by the straight line 58 comes to bear against the lower part of the tapered end portion 24 as shown in FIG. 6 at which time the upper part 24 is fully deformed. This is clearly shown in FIG. 6.

The final cross section of the extreme upper end of the upper part 24 is best shown in FIG. 7 wherein it will be seen that the extreme upper part has become a dripless lip 62 which terminates with the point 36 having been rotated approximately 180° and pointing straight down.

The neck finish 20 with the formed dripless lip 62 is now ready for use and to receive a closure after the associated container 22 has been filled. It will be seen that the radially inner part of the dripless lip 62 which is designated by the reference numeral 64 is conical and provides a good sealing seat for a like surface on an associated closure (not shown).

Reference is now made to FIGS. 8-14 wherein there is illustrated another form of a container pour spout with a dripless lip and the method of forming the same.

Referring first to FIGS. 12 and 13, it will be seen that there is illustrated a blow molded plastic container generally identified by the numeral 70. The container 70 is provided with a neck finish generally identified by the numeral 72. The neck finish 72 includes a base 74 which is provided with threads 76 for engagement by a closure which is generally identified by the numeral 78. The neck finish 72 also includes a pour spout 80 which forms an upper part of the neck finish 72 and defines a pouring mouth 82. It will be seen that the pouring mouth 82 is cylindrical in outline and has a sloping upper edge 84. That part of the pour spout 80 which is uppermost is provided with a dripless lip 86 which is of partial circumference only as is clearly shown in FIG. 12. The pour spout 86 is the principal feature of this form of the invention.

Referring now to FIGS. 8 and 9, it will be seen that there is illustrated the pour spout 80 portion of the container 70 immediately after molding and with the flash (not shown) cut off. Most particularly, it will be seen that the pour spout 80 is provided with an integrally molded radially outwardly directed rib 88 of limited circumferencial extent. Further, and most particularly, it will be seen that the rib 88 lies in a plane which slopes upwardly and to the right when viewed in FIG. 9.

The rib 88 defines the dripless lip 86 and the circumferential extent of the dripless lip 86 corresponds to that of the rib 88. In accordance with this invention, the pour spout 80 is trimmed through the rib 88 at an angle sloping downwardly and to the left as viewed in FIG. 9 and better illustrated in FIGS. 10 and 11. Generally speaking, the plane of the trim is parallel to the plane of the rib 88 and may be at one of several selected vertical positions.

Referring now specifically to FIG. 10, the pour spout 80 portion of the neck finish 72 may be trimmed in a plane identified by the line 90 which goes generally through the center of the rib 88. On the other hand, if the pour spout 80 is trimmed along a plane defined by the line 92, which is lower than the line 90, it will be seen that the resultant dripless lip 86 will terminate in a sharp edge 94.

Further, if the plane of trim is at 96, as illustrated in FIG. 11, an even sharper dripless lip 98 will result. The dripless lip 86 illustrated in FIGS. 12 and 13 is substantially the dripless lip 98 of FIG. 11.

Referring now most specifically to FIGS. 13 and 14, it will be seen that the closure 78, which is preferably molded of a plastic, includes an end panel 100 which terminates in a downwardly and radially outwardly sloping shoulder 102 which, in turn, terminates in a lowermost skirt 104 which is provided with internal threads 106 which match the threads 76.

The closure 78 includes a hollow plug portion 108 which is generally cylindrical and extends downwardly from the end panel 100. The plug portion 108 is provided with a lower radially outwardly directed enlargement 110 which tapers radially outwardly and upwardly as at 112.

It will be seen that the plug portion 108 is of a constant axial length so that when the skirt 104 is engaged with the base 74 of the neck finish 72, the plug portion 108 has just begun to enter into the dripless lip 86 area. As the closure 78 moves downwardly on the neck finish 72, the lower end of the plug portion 88 will gradually enter into the pour spout 80 until it reaches the fully telescoped position of FIG. 14. At this time the enlargement 110 is in radially outward pressure contact with the pour spout 80 through the circumference of the enlargement 110 and thus a seal is formed between the plug portion 108 and the pour spout 80 independently of any seal which may be otherwise formed between the closure 78 and the neck finish 72.

Although only two preferred embodiments of dripless lip arrangements have been specifically illustrated and described herein, it is to be understood that minor variations may be made in the dripless lip configuration and the method of forming the same without departing from the spirit and scope of the invention as defined by the appended claims.

We claim:

1. A method of providing a container neck finish with a dripless finish, said method comprising the steps of providing a tubular neck finish, internally reaming said tubular neck finish to provide an upwardly and radically outwardly gradually thinning taper with said neck finish terminating in a thin edge, and then gradually forcibly turning over radially outwardly said tapered neck finish to form said dripless finish.

2. The method of claim 1 wherein, in the reaming of said neck finish, said neck finish in axial section is brought to a point.

3. The method of claim 1 wherein the reaming of said neck finish is at an angle on the order of 30° to a neck finish axis.

4. A method according to claim 1 wherein said neck finish is gradually heated as said neck finish is gradually turned over.

5. The method of claim 4 wherein said neck finish is heated to soften said neck finish.

6. The method of claim 5 wherein the reaming of said neck finish is at an angle on the order of 30 degrees to a neck finish axis.

7. The method of claim 6 wherein the turning over of said neck finished is continued until said neck finish is turned over about 180 degrees.

8. A method according to claim 1 wherein said gradual forcibly burning over of said tapered neck finish is by way of a rotating tool which frictionally engages said neck finish to produce said gradual heating.

9. A method according to claim 8 wherein said turned over tapered neck finish has a lower internal part which remains tilted and on which said tool seats.

10. A method according to claim 1 wherein said gradual forcibly turning of said tapered neck finish is to the extent that said thin edge faces downwardly.

11. The method of claim 10 wherein said turning over of said neck finished is continued until said neck finish is turned over about 180 degrees.

12. The method of claim 11 wherein the reaming of said neck finish is at an angle on the order of 30 degrees to a neck finish axis.

13. A method according to claim 1 wherein said reaming is centered on an axis of said neck finish wherein said dripless finish extends entirely around said neck finish.

14. The method of claim 1 wherein the step of gradually forcibly turning over radially outward said tapered neck finish is accomplished by contacting said tapered neck finish with a rotating tool.

15. The method of claim 14 wherein said tool, when in contact with said tapered neck finish, is rotated about an axis passing through the center of said neck finish.

16. The method of claim 15 wherein said rotating tool, when in contact with said tapered neck finish, contacts opposite sides of said finish simultaneously.

17. The method of claim 16 wherein the reaming of said neck finish is at an angle on the order of 30 degrees to a neck finish axis.

* * * * *